Dec. 5, 1933.  V. A. SCHOENBERG  1,938,544
COLORIMETER
Filed June 5, 1933
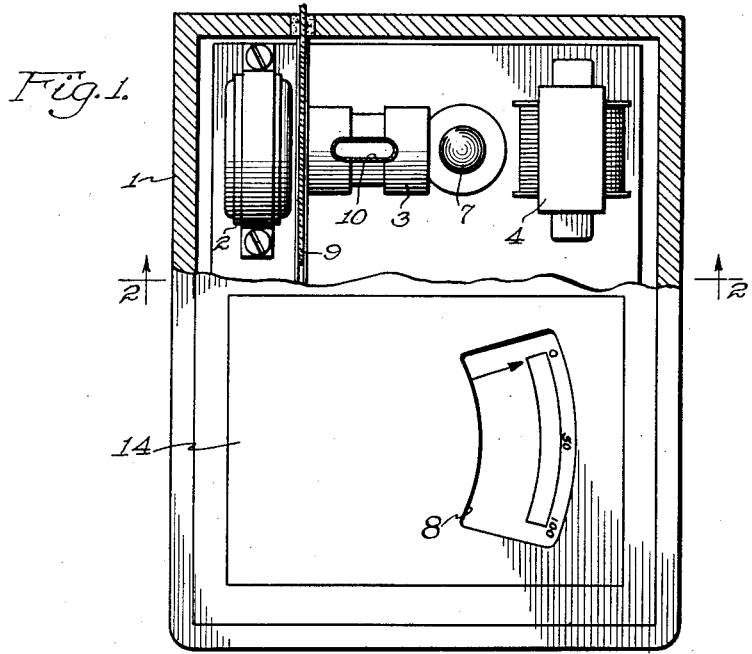
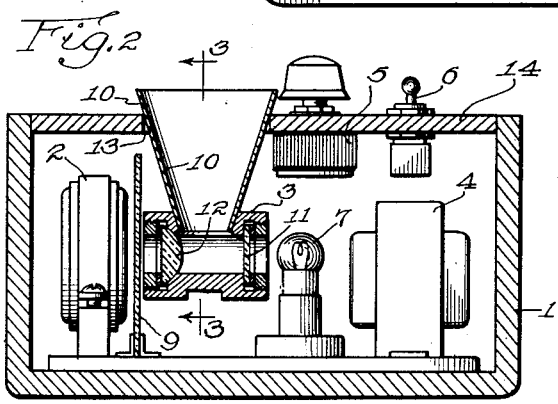
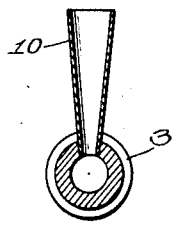
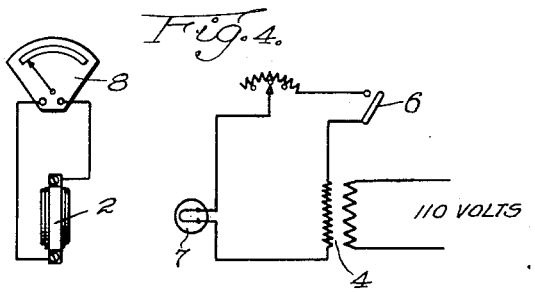
Inventor
Virgil A. Schoenberg
Witness
Arthur M. Franke Patented Dec. 5, 1933

1,938,544

UNITED STATES PATENT OFFICE 1,938,544

COLORIMETER

Virgil A. Schoenberg, Niles Center, Ill., assignor to Light Research Corporation, Niles Center, Ill., a corporation of Illinois Application June 5, 1933. Serial No. 674,357

8 Claims. (Cl. 88—14)

This invention relates to improvements in methods and means for determining the color value of liquids.

The main objects of this invention are to provide a device for determining the color value of liquids with a light receptive device; to provide a neutralized ampule of predetermined dimensions in which the liquid to be tested is placed; to provide a device of the character described in which the neutralized ampule is placed between a light receptive device and a light source; to provide means to control the intensity of the beam of light which penetrates through the liquid to be tested; to provide a calibrated instrument or meter to indicate the color value of liquid; and to provide a means for increasing the sensitivity of the light receptive device.

An illustrative embodiment of this invention is shown in the accompanying drawing in which:—

Figure 1 is a top view of the device with parts broken away.

Fig. 2 is a sectional view taken on the line 2—2 of Figure 1.

Fig. 3 is a sectional view of the liquid receptacle ampule taken on the line 3—3 of Figure 2.

Fig. 4 is a diagrammatic sketch of the two circuits used in the device.

Referring in detail to the construction shown in the drawing, the device comprises a casing 1 having the usual sides and bottom, a light receptive device 2, an ampule 3, a transformer 4, a rheostat 5, a switch 6, an incandescent lamp 7, a calibrated meter 8, and a color filter 9.

The light receptive device 2 may be a photronic cell, a photoelectric cell, or any suitable light sensitive device such as is well known in the art. The light receptive device 2 is connected to a meter 8 which is calibrated to read degrees of color content in any given solution.

The ampule or receptacle 3 is constructed of metal and the inner surface thereof lined with an acid resisting, rust proof material such as porcelain, etc., to prevent the solutions placed in the ampule from chemically attacking it and forming a salt which would modify the character of the solution to be tested. The ampule is of special construction and of predetermined dimensions which are dependent upon the base solution. The ampule 3 comprises a rectangular shaped funnel 10, a flat glass plate 11 which covers one end of the passage through the ampule, and a converging lens 12 which covers the other end of the passage. Both the plate 11 and lens 12 are locked to form liquid-tight joints. A flat glass plate may be substituted for the converging lens 12. The ampule 3 is inserted in the casing 1 through an aperture 13 in the cover plate 14 and is held in position by the funnel 10 through its contact with the cover plate 14.

The primary of the transformer 4 is connected to a source of current. The secondary winding is connected to the rheostat 5 and lamp 7 through switch 6. The rheostat 5 controls the amount of current passing through the lamp 7 to regulate the intensity of the beam of light which reaches the light receptive device 2 through the ampule 3.

The color filter 9 is held in position by a bracket 15 and may or may not be required in determining the color content of the liquid to be tested. The filter, however, increases the range of sensitivity of the light receptive device.

The ampule dimensions are determined by the following procedure, and are required for determining the neutral or node position or depth of the solution under test, whether it be clear or colored.

The determination is based on the phenomena that the readings on the electric meter will be the same when the ampule is empty or filled with the base solution. It has been found that when the light source is placed under an empty flat bottomed cylinder, and a light receptive device placed over the upper end, the light source can be adjusted so that the reading on a meter connected with the light receptive device will assume any desired arbitrary number or value. Then when liquid is inserted into the cylinder, whether it be clear or colored, it will be found that the reading on the meter has increased in value and continues to increase, depending upon the amount of liquid introduced, until it reaches a certain point. As more liquid is added, it will be found that the reading on the meter will gradually return to the arbitrary number or value first selected when the cylinder was empty, and at this point the cylinder is "neutralized." The "neutralized" cylinder now has all the characteristics of the cylinder when it was empty or filled with air, and the same value of light passes through the liquid now that the cylinder is "neutralized" as when the cylinder was empty.

When the correct amount of fluid has been determined the inside dimensions of the tube are carefully measured and a corresponding ampule constructed. Any color value, either plus or minus, in the particular shade or color value of the base solution can now be measured, as the reading on the meter may be converted to read color value in any suitable manner, such as Augstrom units, or can be calibrated to read turbidity when checked with that of a Jackson candle flame turbidometer or any other suitable method when the base solution is distilled water.

It can readily be seen from the description for determining the ampule dimensions that a definite, accurate method for determining a definite volume capacity measurement in laboratory or clinical work is available since a drop or a portion of a drop added to or subtracted from the unneutralized ampule will cause a definite change in the reading of the instrument, either plus or minus, as the case may be from the node or neutralized value. An accurate measurement of volume can now be determined by this instrument.

The observed critical wave length of light, responsive to the ampule of fixed proportions, coincides with the change of refractive index with the wave length, and the occurrence of selective absorption, emission and reflection, which can be explained by the assumption that in general there exist in a given molecule several kinds of electrical systems, each capable of vibrating with a definite period. The simplest source of such electrical system is an electron which is subject to forces of restraint varying directly as the displacement of the electron from its position of equilibrium, and also to forces of an energy dissipating character. If in any one substance, the assumption is made that there exist electrons of as many different periods of vibration as there are wave lengths for which the substance absorbs selectively, it is possible to account for the variation with wave lengths of the refractive index in a very satisfactory manner and for selective absorption, emission and refraction, depending upon the proportions or dimensions of the ampule.

This construction may be adapted for use in clinical laboratories for determining the hemoglobin content of blood and may be utilized as disclosed in the following manner:

It has been found by extensive research that when a specified volume of blood is mixed with a hydrochloric acid solution of specified volume and strength there is a chemical reaction creating "acid hemitin" which assumes a color value, varying from the colorless base solution hydrochloric acid to a deep brown, depending upon the percent of hemoglobin contained in the blood specimen and the strength of the hydrochloric acid base solution.

In adapting this construction for such use, a volume of 5 cubic centimeters of 1 or 2 percent hydrochloric acid solution is mixed with 20 cubic millimeters of blood and agitated to thoroughly mix the two liquids. This solution is then allowed to stand for about fifteen minutes as it has been found that during the first fifteen minutes after the solution is agitated there is a continuous color change taking place, but after it has stood for fifteen minutes the solution stabilizes.

These color variations of the acid hemitin are measured by first obtaining a definite reading on the meter with the base solution, by following the procedure as aforedescribed for color, removing the base solution, and substituting the acid hemitin solution therefor. It will now be found that the meter reading on the scale will indicate the hemoglobin content in the blood. The scale on the meter may be calibrated to read directly the percentage of hemoglobin in the blood.

This method of testing can be readily checked with either the Sahli or Van Slyke method and it will be found that the value of deflection on the meter corresponds to a definite value as set up by either Van Slyke or Sahli, but in a simpler, more efficient and accurate method of determination.

It is to be understood that the details of the construction shown may be altered or omitted without departing from the spirit of this invention as defined by the following claims.

I claim:—

1. The method of determining the color of an unknown solution which comprises determining the length of light path through a base solution which will give the same emergent light value as the same path in air, replacing the base solution by a similar base solution containing the test solution, passing light through the composite solution and determining the color of the composite solution by the effect produced on light sensitive means.

2. The method of determining the color of an unknown solution which comprises determining the length of light path through a base solution which will give the same emergent light value as the same path in air, replacing the base solution by an equal volume of test solution of optical characteristics similar to those of the base solution, passing light through the test solution and determining the color of the test solution by the effect produced on a light sensitive means.

3. In a colorimeter an ampule comprising a tubular member with transparent ends having a light path which will give the same emergent light value when filled with a base solution and when filled with air, a light source adjacent one end of said ampule, light sensitive means adjacent the other end of said ampule, a test solution having similar optical characteristics as the base solution in said ampule, and means for indicating the emergent light falling on said light sensitive means.

4. In a colorimeter for determining the hemoglobin content of blood, a base solution of two percent hydrochloric acid, a tubular ampule with transparent ends having a light path which will give the same emergent light value when filled with said base solution as when filled with air, means for filling and emptying said ampule, a light source adjacent one end of said ampule, light sensitive means adjacent the other end of said ampule, a test solution comprising twenty cubic millimeters of blood in said base solution, and a meter for indicating the emergent light falling on said light sensitive means.

5. In a colorimeter an ampule comprising two glass plates spaced apart by a U shaped spacer having a light path which will give the same emergent light value when filled with a base solution as when filled with air, a light source adjacent one side of said ampule, light sensitive means adjacent the other side of said ampule, a test solution having similar optical characteristics as said base solution in said ampule and a meter for indicating the value of the emergent light through said test solution.

6. A colorimeter for determining the turbidity of a solution, a base solution of clear water, an ampule with transparent ends having a light path which will give the same emergent light value when filled with said base solution as when filled with air, a light source adjacent one end of said ampule, light sensitive means adjacent the other end of said ampule, a water test solution in said ampule and a meter connected with said light sensitive means indicating the change in emergent light value.

7. The method of determining the color value of a solution which comprises establishng a zero line by providing a receptacle having a light path which will give the same emergent light value when filled with the base solution as when filled with air, placing said ampule filled with said base solution between a light source and light sensitive means with a meter to indicate the value of the emergent light, said value establishing the zero point on the meter, then substituting a test solution having the same optical characteristics as the base solution for the base solution to measure the change in emergent value through said test solution.

8. The method of determining the color value of a solution which comprises providing a receptacle having a transparent end, placing said empty receptacle between a light source, and light sensitive means connected to an indicating meter, observing the value of the emergent light, then filling said receptacle with a base solution to the depth where the length of the light path gives the same light emergent value as when empty, then substituting a test solution in said receptacle having exactly the same dimension and inherent optical characteristics and determining the change in value of the emergent light.

VIRGIL A. SCHOENBERG.